B. CANNON.
COTTON HARVESTER.
APPLICATION FILED JULY 29, 1920.

1,400,522.

Patented Dec. 20, 1921.
3 SHEETS—SHEET 1.

Inventor
Burrell Cannon.
E. W. Anderson Son
By
Attorney

B. CANNON.
COTTON HARVESTER.
APPLICATION FILED JULY 29, 1920.

1,400,522.

Patented Dec. 20, 1921.

Inventor
Burrell Cannon

By E. W. Anderson
Attorney

B. CANNON.
COTTON HARVESTER.
APPLICATION FILED JULY 29, 1920.
1,400,522.
Patented Dec. 20, 1921.
3 SHEETS—SHEET 3.
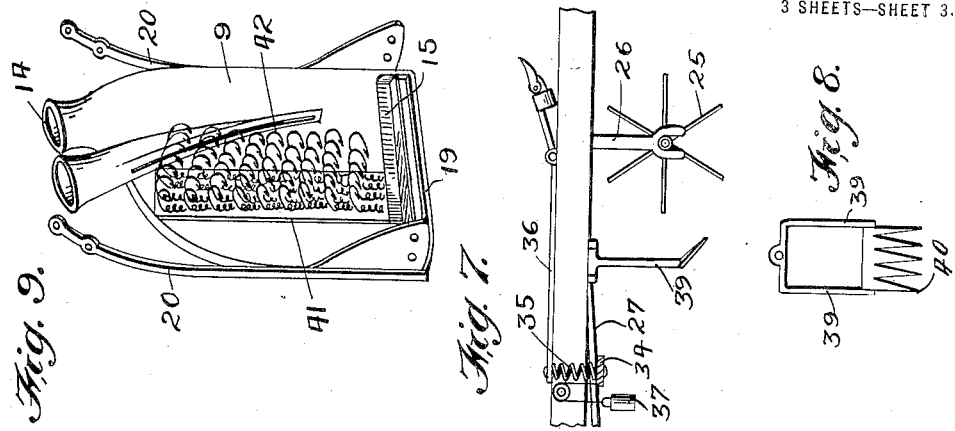
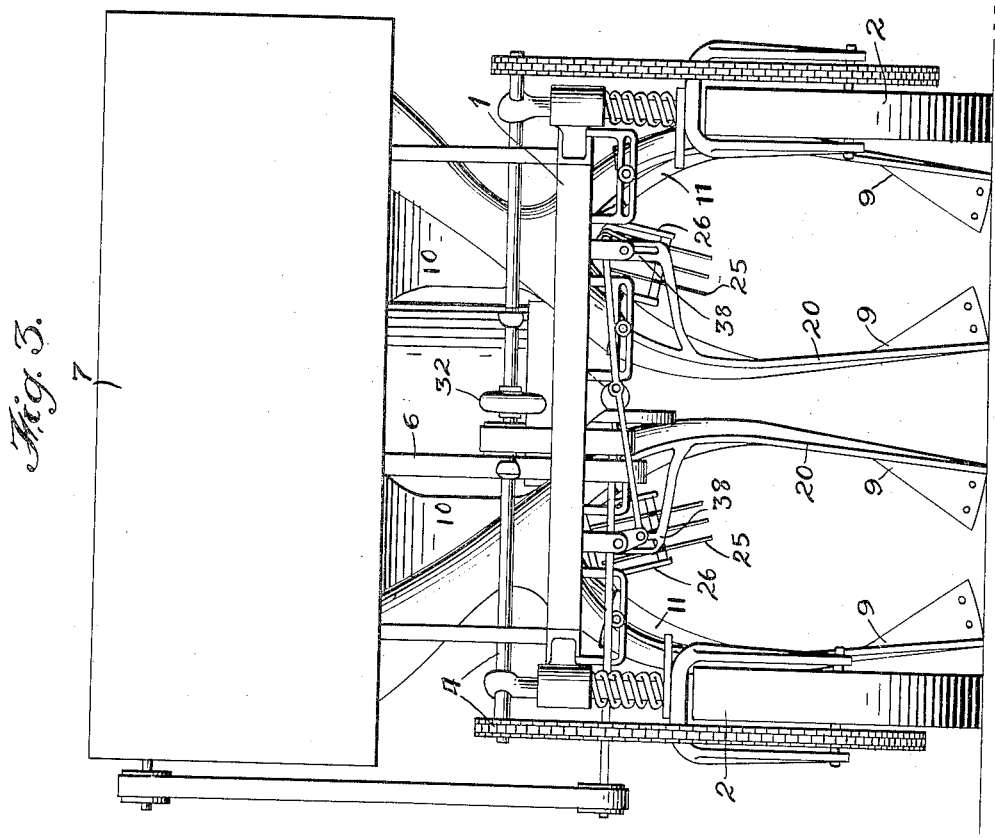
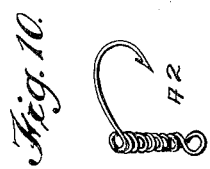
Inventor
Burrell Cannon.
E. W. Anderson Jr.
By
Attorneys.

UNITED STATES PATENT OFFICE.

BURRELL CANNON, OF LONGVIEW, TEXAS.

COTTON-HARVESTER.

1,400,522.   Specification of Letters Patent.   Patented Dec. 20, 1921.

Application filed July 29, 1920. Serial No. 399,819.

*To all whom it may concern:*

Be it known that I, BURRELL CANNON, a citizen of the United States, resident of Longview, in the county of Gregg and State of Texas, have made a certain new and useful Invention in Cotton-Harvesters; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Fig. 3 is a rear view.

Fig. 7 is a detail fragmentary view of the vibrator adjustment devices.

Fig. 8 is a detail front view of the removable comb.

Fig. 9 is a detail perspective view of one of the scoops, with spring hook device attached.

Fig. 10 is a detailed perspective view of one of the spring hooks.

Figure 1:
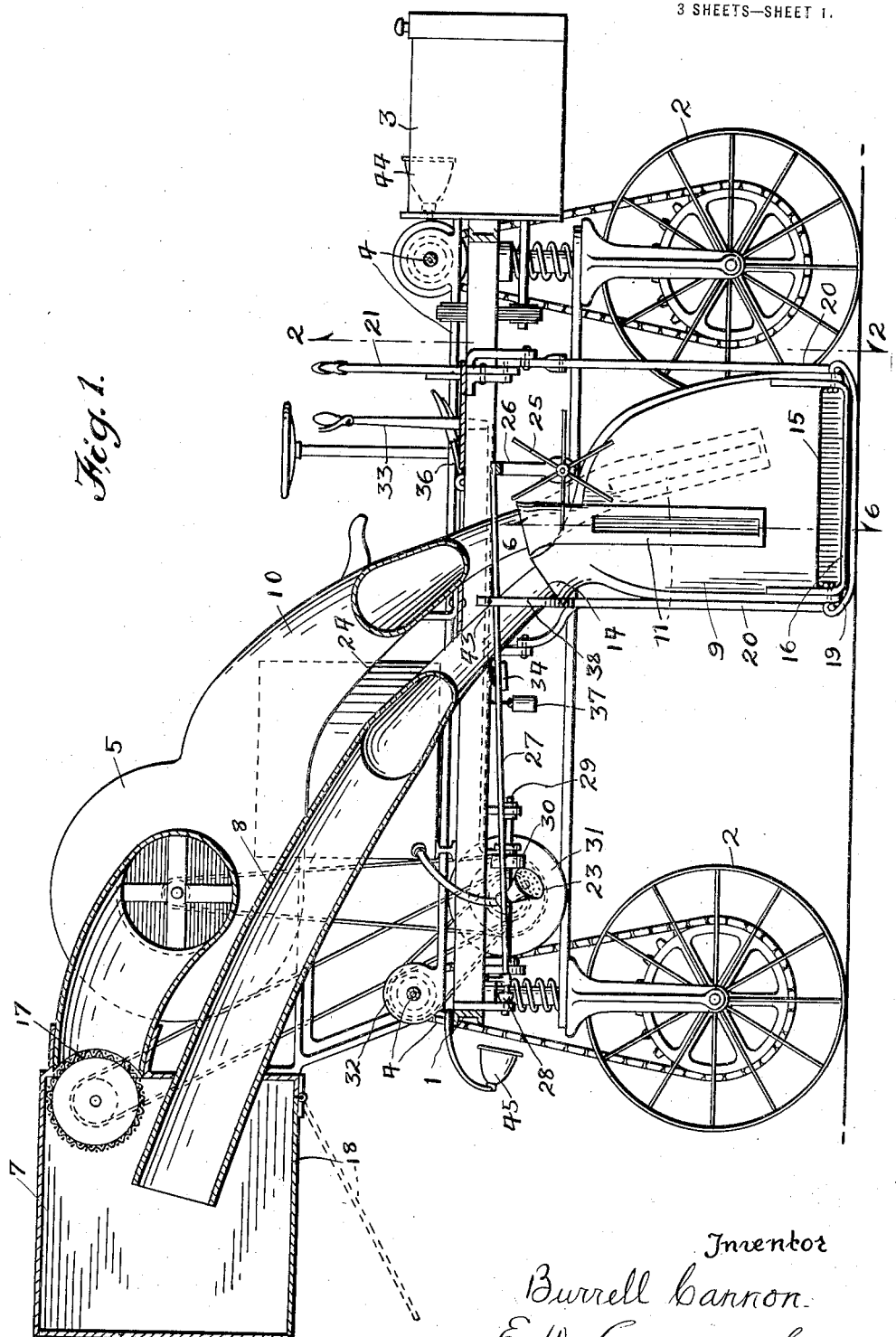
Figure 1 is a longitudinal sectional view of the invention, taken on the line 1—1, Fig. 2.
Figure 4:
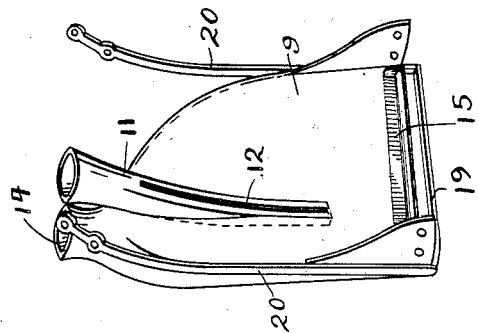
Fig. 4 is a detail perspective view of one of the scoops.
Figure 5:
Fig. 5 is a similar view of the removable bottom scoop section.
Figure 2:
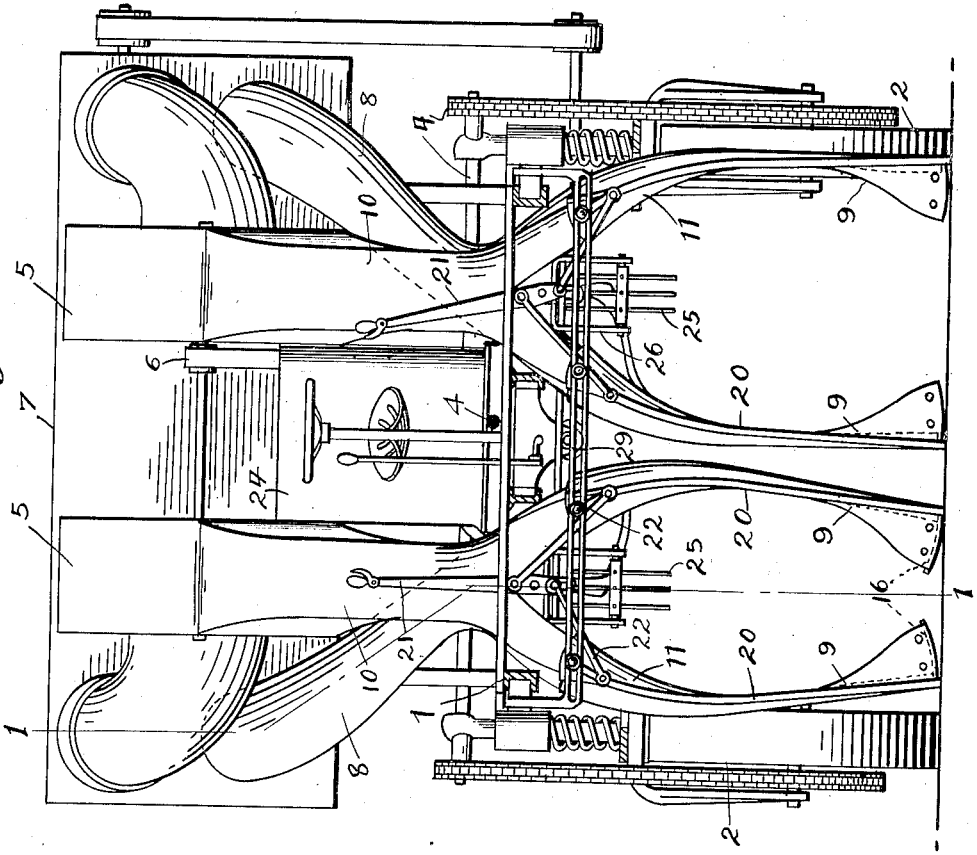
Fig. 2 is a transverse section, taken on the line 2—2, Fig. 1.
Figure 6:
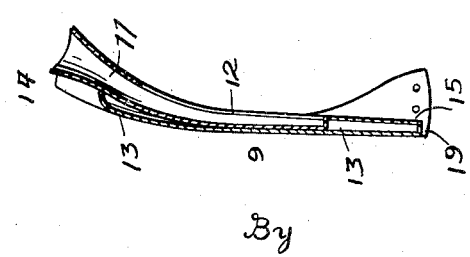
Fig. 6 is a section through one of the scoops, taken on the line 6—6, Fig. 1.

The invention has relation to harvesting or gathering machines, and particularly to a cotton harvester of the pneumatic type.

An object of the invention is the provision of a harvester which will operate upon one or more rows of plants at a time without special manipulation of the picking devices, and which will rapidly and thoroughly harvest the cotton from the open bolls by the application thereto of strong currents of air.

Another object of the invention is the provision of a harvesting machine which may be used upon the growing crop to remove boll weevil and other pests from the plants and clean the ground of dead squares, or forms in which the weevil germinate.

A further object of the invention is the provision of means operating in connection with such a harvester for gathering unopened and frostbitten bolls.

A further object is the provision of mechanical means for loosening the cotton from the bolls of dead plants, at the end of the season, such means operating in connection with the aforementioned pneumatic harvester.

Other objects and advantages will hereinafter appear.

The invention consists in the novel construction and combinations of parts, as hereinafter set forth.

In the accompanying drawings, illustrating the invention, the numeral 1 designates a tractor frame mounted at a suitable height, preferably upon laterally adjustable caster wheels 2. The arrangement shown provides for a four wheel drive, power being derived from a gasolene motor 3 and transmitted to the wheels through connections 4. Suitable steering means are provided for the front and rear wheels.

Upon frame 1 is mounted a powerful double exhaust fan 5, driven from the motor 3 by means of a belt 6 and connections 4, and having suction connection with a container 7. This container has suction pipe connection 8 with laterally opposed scoops 9, adapted to move upon opposite sides and partially to inclose the plants of a row. The device is illustrated as a two-row harvester, two pipes 8 and two sets of scoops 9 being provided. Blast pipes 10, 10 lead from the fan to discharge members 11, 11, attached to and lying between the scoops. Thus the action of the fan establishes a circulatory current of air, from said fan across the rows of plants, into the scoops, through the container and back to the fan.

The discharge openings 12 of the members 11 are somewhat inclined from the vertical, and serve to direct the air diagonally downward across the rows. The opposite members of each pair are disposed in laterally staggered relation, so that the blasts of air will be directed alternately against the plants from opposite sides, a downward cyclonic action being produced between the suction scoops. These scoops are hollow, the chambers 13 formed therein being provided with upper connections 14 with the pipes 8, and with lower horizontal openings 15, through which the material being gathered is sucked. The scoops 9 are provided with detachable, right-angular bottom extensions 16, designed to be drawn close to the stalks of the plants and to underlie the foliage, in position to catch the cotton blown from the bolls and to guide the same to the openings 15.

From the scoops the cotton is sucked into the container 7, where the air is drawn off through rotary screens 17, the cotton remaining in said container until dumped therefrom, through door 18, into a wagon or other receptacle.

The scoops are mounted upon runners 19, attached to the frame 1 through sway bars 20, these bars having means of lateral adjustment upon said frame, to accommodate the scoops to varying widths of rows. The scoops are also capable of lateral pivotal adjustment, upon the sway bar frame bearings as a center, so that they may be drawn toward or moved away from each other, as required by the growth attained by the plants or in avoiding obstructions. The latter adjustment is governed by levers 21, having oppositely acting rods 22 connecting the same with the sway bars.

When the machine is operated for the removal of pests from the growing crop, the bottom extensions 16 of the scoops are removed, and the scoops swung outwardly until they ride centrally between the rows. Any insects, dead squares or trash upon the plants or the ground or flying among the foliage are thus subjected to the blast, and will be delivered to the scoops and drawn into the container 7, wherefrom they may be collected and destroyed. If desired, the crop may simultaneously be treated with insecticide, a sprayer 23 being provided for the purpose, located in rear of the scoops and connected with a storage tank 24.

In order to assist the action of the air blast in loosening the cotton from the boll, a vibrator 25 is provided, consisting preferably of a freely revoluble shaft, mounted in an oscillating frame 26 and provided with radial spring wire fingers. Frame 26 is rigidly connected to a rod 27, extending rearwardly therefrom to a universal joint 28, of which one member is secured to the frame 1. The rod 27 has crank and pitman connection with shaft 29, upon which shaft is keyed a slidable friction pulley 30, having contact with the face of a friction disk 31, driven from the rear differential 32, forming part of the power connections 4. A lever 33 has connection with the friction pulley 30 and serves to adjust the same across the face of disk 31, to vary the rapidity of oscillation imparted to the vibrator 25. The spring fingers of the vibrator engage the foliage of the plants, rolling upon the same as the harvester advances and bending the stalks slightly forward, at the same time vibrating the plants transversely to loosen the seed cotton at the instant that it is subjected to the air blast.

Intermediately of the frames 26 and the universal joints 28, the rods 27 relating to the two sets of row harvesting devices are supported upon a transverse bar 34, suspended by springs 35 from a lever 36 and counterbalanced by weight 37. Lever 36 is controlled by a suitable pedal device, and the weight is so adjusted as to permit the vibrators to drop to lowermost position when the pedal is not depressed. The vibrators, having been adjusted as desired by the pedal control, are held yieldingly in such adjusted position, any unusual resistance by the plants serving to raise the vibrators against the resistance of springs 35.

In order that the vibrators may conform to any lateral adjustment to which the scoops may be set, a vertically slotted guide 38, attached to one member of each set of scoops, engages the respective rod 27, the rod being movable thereby upon joint 28.

For the purpose of detaching frostbitten and unopened bolls from the plants, so that they may be delivered to the scoops by the air blast, an attachment is provided consisting of a frame 39, hung loosely between set collars from rod 27, just in rear of the vibrator, but having no vibratory motion therewith. To frame 39 is attached a comb bar 40, having a serrated forward edge composed of blades spaced about three-quarters of an inch apart and adapted to comb off the bolls as the harvester progresses. These bolls are always found near the top of the stalks, and after being gathered are crushed and have their fiber extracted in huller gins.

After frosts have killed the plants, and injury thereto need no longer be guarded against, a resilient barbed comb may be employed to detach the cotton from the open bolls, thus insuring the harvesting of all of the cotton by the air blast.

To this end an attachment is provided comprising a plate 41, adapted for attachment upon the inside walls of the scoops and extending from the upper portion thereof to the lower suction orifice 15. The plate may be about eight inches wide, and is located immediately adjacent to the forward edge of the scoop. Upon plate 41 is secured a plurality of vertical series of spring wire prongs 42, each prong composed of a loop designed to be engaged by an attachment screw, a vertically disposed coil and a hookform outer end, terminating in an inner barb, presented forwardly. The hooks of the forward series have a radius of about three inches, each succeeding series being formed with hooks of greater radius, so that the entire attachment will present a field of barbed hook ends extending about ten inches inwardly from the scoop. The opposed scoop, similarly equipped, continues this field across the row. As the prongs meet with resistance from the plants they will be bent backwardly, the points and barbs catching in the cotton and pulling it from the bolls, the air blast then cleaning the cotton from the prongs and delivering it to the scoops.

When this attachment is in use the rods 27 are retained in elevated position by means of pins inserted in seats 43 of the guides 38, so that the vibrators are prevented from descending far enough to interfere with the prongs.

The operator is seated above and between the sets of scoops, in position to observe the action of the scoops and vibrators and to adjust the same to secure the best results.

During the cotton harvesting season it is desirable to operate the machine night and day, and to render the harvester suitable for night work, lamps 44 are mounted upon the stems of the front wheel casters, so as to throw the light properly in making sharp turns; while additional lamps 45 are mounted upon the rear frame bar, and arranged to throw light beneath the frame, along the rows being harvested, so that the operator may be enabled to make the proper adjustments.

The harvester is capable of rapid and thorough work with a minimum adjustment of the picking devices. The provision of an air blast coöperating with the suction means is of great importance, since it is impracticable to gather cotton by suction at more than three inches from the suction orifice.

I claim:

1. In a cotton harvester, a fan, a scoop, gathering devices, and means for setting said devices in operative position to be drawn along a row of plants; said devices including a pipe connected to said fan to direct a blast of air outwardly from said fan across the row to said scoop.

2. In a cotton harvester, a fan, a scoop, means for directing a blast of air outwardly from said fan across a row of plants, a suction pipe connecting said fan and said scoop, and a screen interposed in said pipe.

3. In a cotton harvester, a fan, a scoop, means to move the scoop in proximity to and partially underlying a row of plants, and means for creating a current of air across said row to said scoop.

4. In a cotton harvester, a fan, a scoop, means to move the scoop in proximity to and partially underlying a row of plants, means for creating a current of air across said row to said scoop, and means for adjusting said scoop to expose the ground beneath the row to the action of said air current.

5. In a cotton harvester, a fan, opposed suction scoops connected therewith and adapted partially to inclose the plants of a row, and opposed laterally staggered blast devices connected with said fan and coöperating with said scoops.

In testimony whereof I affix my signature, in presence of two witnesses.

BURRELL CANNON.

Witnesses:
J. C. BARBER,
B. ALLEN.